United States Patent Office 3,074,843
Patented Jan. 22, 1963

3,074,843
PROCESS FOR TREATING CELLULOSE
AND OTHER MATERIALS
Paul Lagally and Herta Lagally, State College, Pa., assignors to Linden Laboratories, State College, Pa., a corporation of Pennsylvania
No Drawing. Filed Oct. 24, 1958, Ser. No. 769,298
5 Claims. (Cl. 162—181)

This invention relates to the manufacture of paper products of cellulose containing hydroxides or hydrated oxides essentially of aluminum, the structure of which has been modified by a controlled polymerization. This invention is particularly concerned with the production of paper products wherein the cellulose and clay, or other filler or inorganic or organic pigment, is interacted with modified forms of hydroxides or hydrated oxides of aluminum.

A specific example of one embodiment of this invention is illustrated by the following flowsheet:

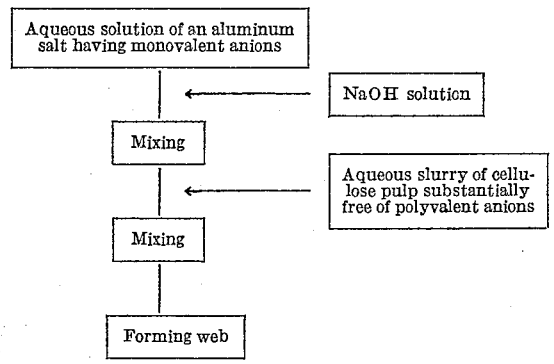

It is the prime object of this invention to produce paper products having extraordinary high dry strength through the employment of modified and activated aluminum hydroxides or hydrated oxides.

It is a further object to produce a type of high dry strength paper which also possesses good wet strength and which may be readily repulped.

Aluminum hydroxide, $Al(OH)_3$, is not stable in the monomer state because the $Al^{3+}$ ion requires a coordination of at least four with respect to oxygen. In order to satisfy the coordination demand of the $Al^{3+}$ ion, monomer $Al(OH)_3$ which is first formed polymerizes and precipitates.

By this polymerization reaction, OH groups of different monomer $Al(OH)_3$ molecules are shared and a polymerized aluminum ortho hydroxide forms (I). Subsequent condensation results in hydrated chain-like macromolecules containing aluminum meta hydroxide building units which are linked together by oxygen bridges (II), until the system, in order to lower its surface free energy, crystallizes. This leads to the formation of boehmite (III) and of bayerite (IV) as the final reaction product of this aging process, where the degree of polymerization and the degree of crystallinity can vary within great limits.

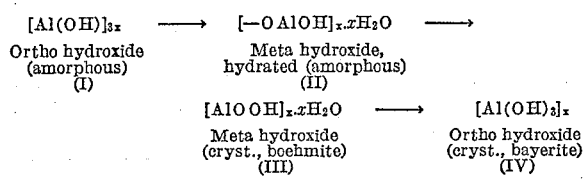

Figure: Aging of aluminum hydroxide

The activity of aluminum hydroxide with regard to cellulose depends on its surface free energy which is a function of the size and the state of order of the particles. It was found that the growth of these particles and their tendency to crystallize can be uniquely controlled by the presence of inorganic or organic monovalent anions and substantially in the absence of nonaluminum-containing polyvalent anions. This controlled polymerization makes possible the formation of modified, partly polymerized forms of aluminum hydroxide which have optimum interactivity with the cellulose and also clay, or other filler or pigment if present, thus providing means for producing paper products which have excellent dry strength and which may be readily repulped.

In accordance with the present invention paper products are produced by forming an aqueous slurry of cellulose, one or more fillers or pigments if desired, and partially polymerized aluminum hydroxide produced by precipitation of aluminum hydroxide from an aqueous solution of an aluminum-containing compound in the presence of monovalent anions and substantially in the absence of nonaluminum-containing polyvalent anions, and then forming a web or sheet from the product resulting from the interaction of the cellulose and the partially polymerized aluminum hydroxide and also the fillers or pigments if present.

Contrary to the past art of sizing paper, where aluminum salts were used primarily as aluminum sulfate, usually in the form of papermaker's alum, it is essential to our invention, in order to properly control the polymerization of aluminum hydroxide and to produce the paper products of our invention, that the aluminum-containing compound in solution and any agents or materials used to cause precipitation of the aluminum hydroxide be selected so that the desired precipitation is carried out in the presence of monovalent anions and substantially in the absence of polyvalent anions other than aluminates. It has been found that the presence of such polyvalent anions, for example, the sulfate ion in a substantial amount will have a serious deleterious effect on the dry strength of the finished paper product. Therefore, in order to obtain paper products of our invention, it is necessary to avoid the presence of nonaluminum-containing polyvalent anions in significant or appreciable amounts.

It is also a feature of the present invention that the monovalent anions be maintained in the slurry of precipitated, partially polymerized aluminum hydroxide preferably at least until the slurry of the cellulose pulp and the aluminum hydroxide is formed, although removal of a small amount of the monovalent anion is possible without serious adverse effect on the properties of the finished paper product. If the precipitated aluminum hydroxide is purified as by washing out most of the monovalent anions, its properties are changed. Thus, dialyzed aluminum hydroxide made from aluminum chloride will not produce desired results.

As above pointed out, the partially polymerized aluminum hydroxide of our invention is prepared by precipitation of aluminum hydroxide from an aqueous solution of an aluminum-containing compound by adjustment of the pH of the solution in the presence of monovalent anions and substantially in the absence of non-aluminum-containing polyvalent anions. Optimum results are obtained by adjustment of the pH within the range of 6 to 9. The precipitated partially polymerized aluminum hydroxide may be produced, as will be appreciated by one skilled in the art, in any one of a number of ways using various materials.

Thus, one method involves adjustment of the pH of an aqueous solution of an aluminum salt, or mixture of aluminum salts, having a monovalent anion by addition of a water-soluble base or bases. For example, the aluminum salt may be aluminum chloride, aluminum bromide, aluminum iodide, aluminum oxychloride, aluminum nitrate, aluminum chlorate, aluminum perchlorate. The pH of an aqueous solution of such an aluminum salt may be adjusted to precipitate aluminum hydroxide, in accordance with our invention, by the addition, for example, of an alkali metal hydroxide, such as sodium hydroxide, potassium hydroxide or lithium hydroxide, or of an alkaline earth metal hydroxide such as calcium hydroxide, magnesium hydroxide, or of ammonia and its water-soluble derivatives such as water-soluble amines; for example, ethyl amine, propyl amine, diethyl amine, monoethanolamine, diethanolamine, triethanolamine. Thus for the precipitation of aluminum hydroxide, all bases can be used under conditions which prevent re-solution of the previously formed hydroxides.

Another method of preparing the partially polymerized aluminum hydroxide involves adjustment of the pH of an aqueous solution of an aluminate by the addition of a water-soluble acid having a monovalent anion, in other words using a monobasic acid, either inorganic or organic, and mixtures thereof. For example, hydrochloric acid, hydrobasic acid, hydroiodic acid, formic acid, and acetic acid may be employed to neutralize the aluminate solution.

Still another method for preparation of the active aluminum hydroxide of our invention involves the interaction, and a water-soluble aluminate, such as sodium aluminate, and a water-soluble aluminum salt having a monovalent anion, such as above-described. Either material may be placed in aqueous solution and the pH of the solution properly adjusted by the addition of the other material. A specific example of this type of reaction involves mixing an aqueous solution of aluminum chloride with an aqueous solution of sodium aluminate in relative amounts such as to result in the desired precipitation of aluminum hydroxide.

In the practice of our invention, the partially polymerized aluminum hydroxide containing the monovalent anions may be added to or mixed with the cellulose pulp, either beaten or unbeaten, preferably containing a filler or pigment, or the aqueous solution of the aluminum-containing compound may be added to or mixed with the cellulose and filler, and the aluminum hydroxide precipitated in situ by adjustment of the pH of the slurry, as above-described. Preferably, an aqueous slurry of the cellulose pulp, and a filler or pigment if desired, is prepared and to this is added the solution of the aluminum-containing material. Then the pH of the slurry is adjusted by the addition of a suitable material, as above-described, to cause the aluminum hydroxide to precipitate in situ and in the absence of nonaluminum-containing polyvalent anions. Finally, a web or sheet is formed of the product of interaction of the cellulose pulp and partially polymerized aluminum hydroxide and filler or pigment if present.

Whereas precipitated metal hydroxides with a high degree of crystallinity have no marked reactivity with such compounds as cellulose and clay, it has been found that gel-like low polymers of $Al(OH)_3$ or $AlOOH$ are highly active crosslinking agents in aqueous systems, with many substances which are covered with OH groups. These OH groups may either be attracted from the aqueous medium and cause a negative electrokinetic potential, which is significant for cellulose and clay, or they may form by hydrolysis of surface ions, which is the case with $CaCO_3$, one of the common fillers. These OH groups may also be OH groups of constitution, for example, alcoholic hydroxy groups in cellulose. Co-polymerization of $Al(OH)_3$ or $AlOOH$ with foreign substances containing OH groups takes place by this reaction, or partly polymerized derivatives of $Al(OH)_3$ or $AlOOH$ are precipitated on the surface of cellulose and compounds such as fillers or other pigments which have similar colloidal chemical properties.

When aluminum hydroxide forms from suitable aluminum salts or from aluminates in the presence of the cellulose pulp, or when aluminum hydroxide, the structure of which has been modified by a controlled polymerization, is added to the pulp, immediate reaction takes place. The retention is almost quantitative within the limits of the receptivity of the cellulose. The strength of hand sheets made of the treated pulp is greatly improved, resulting in an increase of 200% and more in dry tensile strength and of 1000% and more in wet tensile strength. Dry strength papers thus prepared can be disintegrated by dilute alkalies and dilute acids without high temperatures. No further aging of the aluminum hydroxide retained by the cellulose takes place under conditions where aluminum hydroxide normally quickly becomes insoluble after thorough drying. This indicates that a monomer or low polymer type of aluminum hydroxide is embedded in and screened by the cellulose fibers.

The following examples serve to illustrate the practice of the invention:

EXAMPLE I

To a stock slurry of 250 mls. 2% semibleached unbeaten kraft cellulose pulp was added simultaneously, with stirring, 20 mls. of an aqueous solution containing 8.3% by weight $AlCl_3.6H_2O$ and 7 mls. of an aqueous solution containing about 10% ammonia. The resulting neutral mixture was diluted with water to 900 mls. This final mixture contained 0.55% cellulose.

Two paper sheets (diameter—19 mm.) were made of the resulting pulp mixture. The basis weight of the blank sheets was 59.4 lbs. (25 x 40 x 500) or 83.5 grams per square meter.

For the investigation of the dry strength, the sheets were exposed to a standardized climate for 12 hours. Samples for wet strength were soaked simultaneously in water.

The dry tensile strength of the treated sheets was found to be 13.0 lbs. per inch, that of the blank 5.4 lbs. per inch. That is an increase in strength of 140%. The wet tensile strength was found to be 2.29 lbs. per inch as compared with 0.34 lb. per inch for the blank. This is an increase of 570%. The relative wet strength of the treated sheet is 17.6% of its dry strength or 42% of the dry strength of the blank, respectively.

The ash content of the treated paper was 5.1%. That is a retention of 77% (theoretical retention=6.6% $Al_2O_3$). This wet strength paper can be digested quickly in dilute alkalies (NaOH) or acids (HCl).

EXAMPLE II

To a stock slurry of 250 mls. 2% cellulose pulp (semibleached kraft) was added 20 mls. 8.3% $AlCl_3.6H_2O$ solution and 6 mls. 40% triethanolamine solution, and the mixture was diluted to 900 mls. Two hand sheets were made. They had a dry tensile strength of 8.0 lbs. per inch and a wet tensile strength of 2.0 lbs. per inch. The relative wet strength is 25%.

EXAMPLE III

To a stock slurry of 250 mls. 2% cellulose pulp (semibleached kraft) was added 40 mls. 8.3% $AlCl_3.6H_2O$ solution and 14 mls. of about 10% ammonia solution. The mixture was diluted to 900 mls. Two hand sheets were made of this pulp. The dry tensile strength of the treated paper was found to be 17.7 lbs. per inch, that of the blank 5.4 lbs. per inch. The wet tensile strength of the treated paper was 4.1 lbs. per inch, that of the blank 0.34 lb. per inch. The increase of the dry strength is 228%, that of the wet strength 1200%. The relative wet strength of the treated paper is 23% or 76% of the dry strength of the blank.

The ash content of the treated paper was 8.3%. That is a retention of 67.5% (theoretical retention=12.3% $Al_2O_3$).

The paper disintegrates immediately in contact with 0.5% sodium hydroxide solution or hydrochloric acid.

EXAMPLE IV

To stock, slurries of 250 mls. 2% cellulose pulp of various types shown in the table which follows were added 20 mls. of an aqueous solution containing 8.3% by weight of $AlC_3.6H_2O$ and 7 mls. of a solution containing about 10% ammonia. The resulting neutral mixture was diluted to 900 mls., and two hand sheets were made.

In all experiments both the dry strength and the wet strength of the paper sheets were increased considerably. In the following table $w_b.10^2/d_b$ represents the relative wet strength of the blank sheet, and $w_t.10^2/d_b$ represents the relative wet strength of the treated sheet as compared to the dry strength of the blank. This last value is a measure of the actually achieved increase in wet strength without considering the increase in dry strength.

Table

| Type of cellulose | Lbs./inch | | Tensile strength Percent | |
|---|---|---|---|---|
| | Dry | Wet | $\frac{w_b.10^2}{d_b}$ | $\frac{w_t.10^2}{d_b}$ |
| Soda, low grade: | | | | |
| Treated | 14.95 | 2.33 | 5.7 | 133 |
| Blank | 1.75 | 0.10 | | |
| Soda, high grade: | | | | |
| Treated | 11.40 | 2.06 | 2.2 | 46 |
| Blank | 4.50 | 0.10 | | |
| Sulfite, Scandinavia: | | | | |
| Treated | 10.72 | 3.28 | 13.3 | 85 |
| Blank | 3.84 | 0.51 | | |
| Kraft, pine: | | | | |
| Treated | 17.8 | 2.94 | 3.5 | 35 |
| Blank | 8.4 | 0.29 | | |
| Kraft, Douglas-fir: | | | | |
| Treated | 12.2 | 2.25 | 5.5 | 28 |
| Blank | 8.1 | 0.45 | | |
| Kraft, gum: | | | | |
| Treated | 10.65 | 1.81 | 1.6 | 30 |
| Blank | 6.1 | 0.10 | | |

EXAMPLE V

To stock slurries of 250 mls. 2% unbeaten kraft cellulose pulp was added 20 mls. of the following solutions containing 0.54 gram equivalents $Al(OH)_3$:

(a) 8.3% by weight $AlCl_3.6H_2O$
(b) 12.9% by weight $AlBr_3.6H_2O$
(c) 14.0% by weight $AlI_3$ Ammonia was added in an amount sufficient to neutralize the pulp mixtures. After diluting to 900 mls., two hand sheets of 60 lbs. basis weight were made.

Tensile strength data listed below show that all three aluminum halides yield about equally effective aluminum hydroxide.

| Aluminum hydroxide made of— | Tensile strength, lbs./inch | |
|---|---|---|
| | Dry | Wet |
| Blank | 7.6 | 0.43 |
| $AlCl_3$ | 17.8 | 2.20 |
| $AlBr_3$ | 17.2 | 2.04 |
| $AlI_3$ | 18.8 | 2.86 |

EXAMPLE VI

To a stock slurry of 250 mls. 2% kraft cellulose pulp was added, with stirring, a neutral mixture of 20 mls. of 8.3% $AlCl_3.6H_2O$ solution with 8.5 mls. of about 10% ammonia, which had been kept at room temperature for 30 minutes. After diluting to 900 mls. two hand sheets were made which had a dry tensile strength of 11.0 lbs. per inch and a wet tensile strength of 1.90 lbs. per inch. When the $AlCl_3$ solution was neutralized with ammonia in the presence of the pulp, hand sheets made of the resulting mixture had a dry tensile strength of 10.9 lbs. per inch and a wet tensile strength of 2.14 lbs. per inch. The dry strength of the blank was 4.16 lbs. per inch and the wet strength was 0.20 lb. per inch.

This example shows that aluminum hydroxide made of aluminum chloride where the polymerization of the alumina gel particles is sufficiently controlled by the presence of the $Cl^-$ ions retains its activity over a considerable length of time.

EXAMPLE VII

Aqueous solutions, which were 0.345 molar with respect to $Al(OH)_3$, containing:

(a) 11.5% by weight $Al_2(SO_4)_3.18H_2O$
(b) 13.0% by weight $Al(NO_3)_3.9H_2O$
(c) 8.3% by weight $AlCl_3.6H_2O$ were neutralized with ammonia to pH=7 and the resulting aqueous slurries containing aluminum hydroxide were stirred at room temperature over a period of several hours.

Equal parts of these slurries containing 0.54 gram aluminum hydroxide (corresponding to 20 mls. of the aluminum salt solutions used) were added to successive 250 ml. portions of 2% cellulose pulp (unbleached kraft). Hand sheets of 60 lbs. basis weight were made of the treated pulp.

Strength data listed below illustrate the influence of aging of aluminum hydroxide on its reactivity to cellulose and also the deleterious effect of the polyvalen tsulfate ion. With aluminum sulfate as starting material, the dry strength of paper sheets made of the treated pulp was substantially less than that of the blank and did not increase by aging. To the contrary with aluminum nitrate and aluminum chloride, an increase in dry strength up to 200% was obtained. While all three types of hydroxides increased the wet tensile strength of the paper made of the treated pulp, the aluminum hydroxide made of aluminum nitrate and aluminum chloride gave much higher values than that made with aluminum sulfate.

| Aging hours | Tensile strength, lbs./inch | | | | | |
|---|---|---|---|---|---|---|
| | $Al_2(SO_4)_3.18H_2O$ | | $Al(NO_3)_3.9H_2O$ | | $AlCl_3.6H_2O$ | |
| | Dry | Wet | Dry | Wet | Dry | Wet |
| Blank | 9.1 | 0.49 | 8.9 | 0.39 | 8.5 | 0.40 |
| 0.0 | 7.0 | 1.25 | 13.4 | 2.59 | 11.2 | 2.14 |
| 0.5 | 6.5 | 1.23 | 15.2 | 2.51 | 11.0 | 2.41 |
| 1.0 | 6.3 | 1.36 | 15.5 | 2.47 | 12.1 | 2.12 |
| 1.5 | 7.1 | 1.40 | 14.9 | 2.30 | 13.4 | 2.44 |
| 2.0 | 7.1 | 1.65 | 16.1 | 2.12 | 13.2 | 2.29 |
| 2.5 | 7.4 | 1.38 | | | 16.9 | 2.41 |
| 3.0 | 7.0 | 1.67 | 16.4 | 2.40 | 17.9 | 2.31 |
| 3.5 | 6.8 | 1.49 | | | 19.2 | 2.96 |
| 4.0 | 7.6 | 1.67 | 18.0 | 2.41 | >20.0 | 2.76 |
| 4.5 | 7.3 | 1.30 | | | 20.0 | 3.46 |
| 23.5 | | | | | 17.9 | 2.45 |
| 53.0 | | | 13.2 | 1.61 | | |
| 96.5 | 5.7 | 1.94 | | | | |

EXAMPLE VIII

To stock slurries of 250 mls. of cellulose pulp (unbleached kraft) were added successive portions containing equal amounts (0.54 gram) aluminum hydroxide which was obtained as follows:

A. An aqueous solution containing 8.3% by weight $AlCl_3.6H_2O$ was neutralized with ammonia and the obtained mixture containing aluminum hydroxide was aged for several hours while constantly stirred at room temperature.

B. An aqueous solution containing 8.3% by weight $AlCl_3.6H_2O$ was neutralized with ammonia and the obtained mixture containing aluminum hydroxide was allowed to age for several hours at room temperature without stirring.

After diluting to 900 mls., hand sheets of 60 lbs. basis weight were made. Tensile strength data listed below illustrate the influence of stirring on the activity of aluminum hydroxide to cellulose pulp. With stirring, considerably stronger hand sheets were obtained.

| Aging hours | Tensile strength, lbs./inch | | | |
|---|---|---|---|---|
| | With stirring | | Without stirring | |
| | Dry | Wet | Dry | Wet |
| Blank | 8.9 | 0.39 | 8.2 | 0.40 |
| 0 | 11.2 | 2.14 | 15.8 | 2.76 |
| 2.5 | 16.9 | 2.41 | 15.2 | 2.83 |
| 4.5 | 20.0 | 2.76 | 12.3 | 2.68 |

EXAMPLE IX

A stirred aqueous slurry containing 2.83% by weight sodium aluminate, $Na_2Al_2O_4$, was saturated with $CO_2$ and the bubbling of gas was continued for several hours. From this solution which had a weakly alkaline reaction (pH=8) aluminum hydroxide of high purity separated.

Another quantity of the same sodium aluminate solution was partially neutralized to pH=8 using hydrochloric acid instead of $CO_2$ with the experimental conditions (pH, temperature, stirring) being the same. Here, the aluminum hydroxide was obtained in the form of a highly hydrated gel which did not separate or precipitate.

Equal parts of these mixtures containing 0.54 gram of aluminum hydroxide were added to successive 250 ml. portions of 2% unbeaten kraft cellulose pulp. After diluting to 900 mls. hand sheets of 60 lbs. basis weight were made of the treated pulp.

Data listed below show that pure aluminum hydroxide obtained from $Na_2Al_2O_4$ and $CO_2$ was found to be detrimental, but with HCl as the neutralizing agent, highly active aluminum hydroxide was obtained.

| Aging hours | Solution | Tensile strength, lbs./inch | |
|---|---|---|---|
| | | Dry | Wet |
| Blank | | 10.0 | 0.44 |
| 0 | $Na_2Al_2O_4+CO_2$ | 6.4 | 0.56 |
| ½ | $Na_2Al_2O_4+CO_2$ | 6.6 | 0.53 |
| 1 | $Na_2Al_2O_4+CO_2$ | 7.8 | 0.54 |
| 4½ | $Na_2Al_2O_4+CO_2$ | 8.3 | 0.46 |
| 55 | $Na_2Al_2O_4+CO_2$ | 9.1 | 0.69 |
| Blank | | 10.0 | 0.44 |
| 0 | $Na_2Al_2O_4+HCl$ | 14.2 | 2.95 |
| 1 | $Na_2Al_2O_4+HCl$ | 16.9 | 2.82 |
| 4 | $Na_2Al_2O_4+HCl$ | 22.5 | 2.32 |
| 51 | $Na_2Al_2O_4+HCl$ | 23.5 | 3.11 |

EXAMPLE X

To 120 mls. of a stirred aqueous solution containing 2.83% by weight of sodium aluminate was added 3 mls. acetic acid and stirring was continued for several hours.

Equal parts of the neutral mixture obtained containing 0.54 gram aluminum hydroxide were added to successive 250 ml. portions of 2% cellulose pulp (unbleached kraft). After diluting to 900 mls., hand sheets of 60 lbs. basis weight were made.

Data listed below give the increase in tensile strength obtained with this type of active aluminum hydroxide.

| Aging hours | Solution | Tensile strength, lbs./inch | |
|---|---|---|---|
| | | Dry | Wet |
| Blank | | 10.2 | 0.62 |
| 0 | Aluminum hydroxide | 14.0 | 3.08 |
| 1 | do | 14.4 | 3.71 |
| 2 | do | 13.0 | 2.75 |
| 3 | do | 14.6 | 3.06 |

EXAMPLE XI

Seven 250 ml. stock slurries containing 2% unbleached kraft pulp were prepared. There was then added 20 mls. of a solution containing an aluminate or an aluminum salt of the type and in the amounts as follows:

Pulp mixture:
 (1) Blank.
 (2) 2.8% $Na_2Al_2O_4$.
 (3) 2.8% $Na_2Al_2O_4$.
 (4) 2.8% $Na_2Al_2O_4$.
 (5) 8.3% $AlCl_3.6H_2O$.
 (6) 13.0% $Al(NO_3)_3.9H_2O$.
 (7) 11.5% $Al_2(SO_4)_3.18H_2O$.

Each mixture, except the blank contained aluminum compounds with an aluminum content equivalent to 0.54 gram of aluminum hydroxide. Pulp mixtures 2 to 4 were then neutralized respectively with sulfuric acid, nitric acid, and hydrochloric acid. Pulp mixtures 5 to 7 were all neutralized with ammonia. Hand sheets of 60 lbs. basis weight were made from the pulp mixtures. Strength data on these hand sheets are as follows:

*Increase in Paper Strength, 10% $Al(OH)_3$ Added*

| $Al(OH)_3$ made of— | Tensile strength, lbs./inch | |
|---|---|---|
| | Dry | Wet |
| 1. Blank | 10.9 | 0.40 |
| 2. $Na_2Al_2O_4+H_2SO_4$ | 8.5 | 2.68 |
| 3. $Na_2Al_2O_4+HNO_3$ | 16.3 | 3.48 |
| 4. $Na_2Al_2O_4+HCl$ | 20.0 | 4.42 |
| 5. $AlCl_3+NH_4OH$ | 18.9 | 2.87 |
| 6. $Al(NO_3)_3+NH_4OH$ | 17.4 | 3.04 |
| 7. $Al_2(SO_4)_3+NH_4OH$ | 10.7 | 2.63 |

These data show that the presence of sulfate ions has a deleterious effect on the activity of the precipitated aluminum hydroxide, the paper web containing it having a lower dry strength than the blank.

The products of this invention are crosslinked cellulose webs. They have increased dry strength as well as good wet strength, and they may be readily repulped if desired.

The strength of paper is ordinarily limited by the fiber-to-fiber bonds. No process has been reported so far which would increase the strength of these fiber-to-fiber bonds to an amount comparable with the tensile strength of the single fibers, which approaches that of steel. So far as is known, there is no process which would permit the manufacture of a paper product which has considerably increased dry strength, without special equipment or subsequent treatment of the paper. Several paper resins, which improve the dry strength only moderately are in use mainly to improve the wet strength of paper. The drawbacks of these products are well-known. Melamine formaldehyde resins can be stored for a considerable length of time, but they must be cured by a well-controlled acid treatment in order to achieve substantivity to the cellulose fibers. Substantive urea formaldehyde resins are commercially available, but they generally have only a limited life. Most paper resins are effective only in the acid medium. Polyethyleneamine, on the other hand, needs an alkaline medium in order to be retained by the cellulose. The retention of many of these resin colloids is insufficient, and the treated paper must be cured in order to develop maximum strength properties. The recovery of the broke and the de-inking of such wet strength papers conventionally treated with resins of the amine type presents considerable disadvantages.

Paper products treated according to this invention avoid these disadvantages. The coordination forces of poorly screened cations strongly attract surface OH groups of cellulose and other compounds present, for example, fillers, and the strength of fiber-to-fiber bonds or bonds between the surface of fibers and fillers is increased. Dry strength of the paper is increased to a surprising degree. The chemicals used are economic and can be stored indefinitely. The active hydroxides have high substantivity to cellulose and exhibit maximum reactivity in neutral media. Since no curing is necessary, maximum strength properties are obtained while the paper is being dried, and the disintegration of the paper and recovery of the broke needs no special processing.

It is particularly important that cellulose pulp of poor grade can be improved considerably by this process. Such types of cellulose consist mainly of short and broken fibers and of degradation products thereof. The high specific surface of such low grade fibrous material is activated by the interaction with the modified aluminum hydroxides and paper of high grade is obtainable. The treated paper, in addition to its outstanding strength properties, is very tough and flexible. It shows no brittleness, since no binding material of larger particle size, which would separate the fibers, is deposited.

In practice of the invention, from 0.5% to 20% by weight of aluminum hydroxide is preferably employed, based on the weight of cellulose in the dry sheet.

Products manufactured in accordance with the process of the present invention are all kinds of paper in which increased strength properties are desired, such as wrapping papers, spinning papers, papers for highway construction, wet strength towels, wet strength paper bags, wet strength filter webs, map papers, all types of printing paper which contain filler particles uniformly distributed through the paper sheet or papers used for artificial leather or as backings for pressure sensitive adhesive tapes, which contain elastomeric impregnants deposited on the fibers and which are characterized by high tear strength and high delamination resistance.

The invention in its broader aspects is not limited to the processes described, but departures may be made therefrom within the scope of the accompanying claims.

This application is a continuation in part of our co-pending application Serial No. 616,373, filed October 17, 1956, now abandoned.

We claim:

1. A process for producing paper products which comprises the steps of forming an aqueous slurry of cellulose pulp, substantially free of polyvalent anions, and amorphous aluminum hydroxide produced by precipitation of aluminum hydroxide from an aqueous solution of an aluminum-containing compound in the presence of monovalent anions and substantially in the absence of non-aluminum-containing polyvalent anions, and forming a web from the product resulting from interaction of the cellulose pulp and the aluminum hydroxide, said aluminum hydroxide being present in an amount of from 0.5 percent to 20 percent based on the weight of the cellulose pulp.

2. A process for producing paper products which comprises the steps of forming an aqueous solution of an aluminum-containing compound selected from the group consisting of water soluble aluminum salts having monovalent anions and water soluble aluminates; adjusting the pH of said solution, substantially in the absence of non-aluminum-containing polyvalent anions, to cause precipitation of amorphous aluminum hydroxide, thereby forming an aqueous slurry of precipitated aluminum hydroxide containing monovalent anions in solution; then, without removing said monovalent anions from said slurry, mixing cellulose pulp substantially free of polyvalent anions with said slurry; and finally forming a web from the product resulting from interaction of the cellulose pulp and the aluminum hydroxide, said aluminum hydroxide being present in an amount of from 0.5 percent to 20 percent based on the weight of the cellulose pulp.

3. A process for producing paper products which comprises the steps of forming an aqueous solution of an aluminum-containing compound selected from the group consisting of water soluble aluminum salts having monovalent anions and water soluble aluminates; mixing said solution with cellulose pulp substantially free of polyvalent anions, adjusting the pH of the resulting mixture, substantially in the absence of nonaluminum-containing polyvalent anions, to cause precipitation of amorphous aluminum hydroxide, thereby forming an aqueous slurry of cellulose pulp and precipitated aluminum hydroxide containing monovalent anions in solution; and then forming a web from the product resulting from interaction of the cellulose pulp and the aluminum hydroxide, said aluminum hydroxide being present in an amount of from 0.5 percent to 20 percent based on the weight of the cellulose pulp.

4. A process for producing paper products which comprises the steps of forming an aqueous slurry of cellulose pulp, substantially free of polyvalent anions, and amorphous aluminum hydroxide produced by precipitation, substantially in the absence of nonaluminum-containing polyvalent anions, of aluminum hydroxide from an aqueous solution of an aluminum salt having a monovalent anion, and forming a web from the product resulting from interaction of the cellulose pulp and the aluminum hydroxide, said aluminum hydroxide being present in an amount of from 0.5 percent to 20 percent based on the weight of the cellulose pulp.

5. A process for producing paper products which comprises the steps of forming an aqueous slurry of cellulose pulp, substantially free of polyvalent anions, and amorphous aluminum hydroxide produced by precipitation, substantially in the absence of nonaluminum-containing polyvalent anions, of aluminum hydroxide from an aqueous solution of an aluminate, and forming a web from the product resulting from interaction of the cellulose pulp and the aluminum hydroxide, said aluminum hydroxide being present in an amount of from 0.5 percent to 20 percent based on the weight of the cellulose pulp.

References Cited in the file of this patent

UNITED STATES PATENTS

| 1,713,642 | Booth | May 21, 1929 |
| 2,085,129 | Stoewener | June 29, 1937 |
| 2,593,125 | Eaton | Apr. 15, 1952 |
| 2,661,288 | Barbaras | Dec. 1, 1953 |
| 2,825,645 | Eichmeier | Mar. 4, 1958 |
| 2,917,426 | Bugosh | Dec. 15, 1959 |
| 2,930,106 | Wrotnowski | Mar. 29, 1960 |

FOREIGN PATENTS

| 89,291 | Sweden | May 19, 1937 |
| 844,945 | France | May 1, 1939 |
| 631,483 | Great Britain | Nov. 3, 1949 |

OTHER REFERENCES

Rowland et al.: "The Alumina Content of Rosin Free Hand Sheets in Relation to Tub Sizing," Paper Trade Journal, vol. 119, No. 20, November 16, 1944, pages 29–33.

UNITED STATES PATENT OFFICE
CERTIFICATE OF CORRECTION

Patent No. 3,074,843            January 22, 1963

Paul Lagally et al.

It is hereby certified that error appears in the above numbered patent requiring correction and that the said Letters Patent should read as corrected below.

Column 3, line 22, for "hydrobasic" read -- hydrobromic --; line 27, strike out ", and" and insert instead -- of --; column 6, line 28, for "polyvalen tsulfate" read -- polyvalent sulfate --; column 7, lines 35 to 50, and lines 62 to 72, in the tables, second columns headings strike out "Solution", each occurrence; third columns headings of the tables for "Tensile strength, lbs./inch", each occurrence, read -- Tensile strength (lbs./inch); the word "Blank",appearing in the first line of each group, should be changed to the second column of each group.

Signed and sealed this 20th day of August 1963.

(SEAL)
Attest:

ERNEST W. SWIDER
Attesting Officer

DAVID L. LADD
Commissioner of Patents